United States Patent
Shono et al.

(10) Patent No.: US 6,168,171 B1
(45) Date of Patent: Jan. 2, 2001

(54) VEHICLE HEIGHT ADJUST CONTROL APPARATUS AND METHOD

(75) Inventors: Shoichi Shono, Nishikamo-gun; Atushi Sato, Susono, both of (JP)

(73) Assignee: Toyota Jidosha Kabushiki Kaisha, Toyota (JP)

( * ) Notice: Under 35 U.S.C. 154(b), the term of this patent shall be extended for 0 days.

(21) Appl. No.: 09/166,180

(22) Filed: Oct. 5, 1998

(30) Foreign Application Priority Data

Nov. 21, 1997 (JP) .................................................. 9-321524

(51) Int. Cl.[7] ................................................. B60G 17/005
(52) U.S. Cl. ..................................... 280/5.507; 280/5.514; 280/6.16; 701/37; 701/38; 701/39
(58) Field of Search ............................. 280/6.157, 6.159, 280/6.16, 5.507, 5.514; 701/36, 37, 38, 39, 48

(56) References Cited

U.S. PATENT DOCUMENTS

| | | | |
|---|---|---|---|
| 4,593,920 | * | 6/1986 | Natsume et al. ........................... 280/6 |
| 4,693,493 | * | 9/1987 | Ikemoto et al. ...................... 280/707 |
| 4,787,644 | * | 11/1988 | Yokote et al. .............................. 280/6 |
| 4,803,630 | * | 2/1989 | Takizawa et al. ............... 364/424.05 |
| 4,958,850 | * | 9/1990 | Buma et al. ........................... 280/714 |
| 5,044,660 | * | 9/1991 | Yamamura et al. .................. 280/707 |
| 5,069,475 | * | 12/1991 | Yonekawa et al. ................... 280/707 |
| 5,071,158 | * | 12/1991 | Yonekawa et al. ................... 280/707 |
| 5,083,275 | * | 1/1992 | Kawagoe et al. ............... 364/424.05 |
| 5,287,277 | * | 2/1994 | Mine et al. ...................... 364/424.05 |
| 5,364,122 | * | 11/1994 | Ichimaru ............................... 280/709 |
| 5,384,705 | * | 1/1995 | Inagaki et al. .................. 364/424.05 |
| 5,430,647 | * | 7/1995 | Raad et al. ...................... 364/424.05 |
| 5,466,007 | * | 11/1995 | Smith ..................................... 280/840 |
| 5,481,459 | * | 1/1996 | Bungeler ......................... 364/424.05 |
| 5,515,274 | * | 5/1996 | Mine et al. ...................... 364/424.05 |
| 5,521,821 | * | 5/1996 | Shimizu et al. ................ 364/424.05 |
| 5,691,899 | * | 11/1997 | Terasaki ........................ 364/424.047 |
| 5,696,678 | * | 12/1997 | Raad et al. ...................... 364/424.05 |
| 5,941,919 | * | 8/1999 | Pastor et al. ............................ 701/36 |

FOREIGN PATENT DOCUMENTS

| | | |
|---|---|---|
| 60-261714 | 12/1985 | (JP) . |
| 2-3508 | 1/1990 | (JP) . |
| 2-151515 | 6/1990 | (JP) . |
| 5-58133 | 3/1993 | (JP) . |

* cited by examiner

Primary Examiner—Brian L. Johnson
Assistant Examiner—J. Allen Shriver
(74) Attorney, Agent, or Firm—Oliff & Berridge, PLC

(57) ABSTRACT

The method of controlling a vehicle height adjust apparatus for a vehicle that includes an actuator capable of changing a vehicle height, a height detector that detects the vehicle height and a controller linked to the actuator that receives parameters indicating a state of the vehicle includes the steps of detecting the vehicle height and at least one of a steering angle of a steering wheel of the vehicle and a differential-limited state of wheels of the vehicle, and controlling the actuator with the controller to adjust the vehicle height to approach the target vehicle height if the steering angle is not greater than a predetermined steering angle and/or the wheels are not in a differential-limited state.

16 Claims, 5 Drawing Sheets

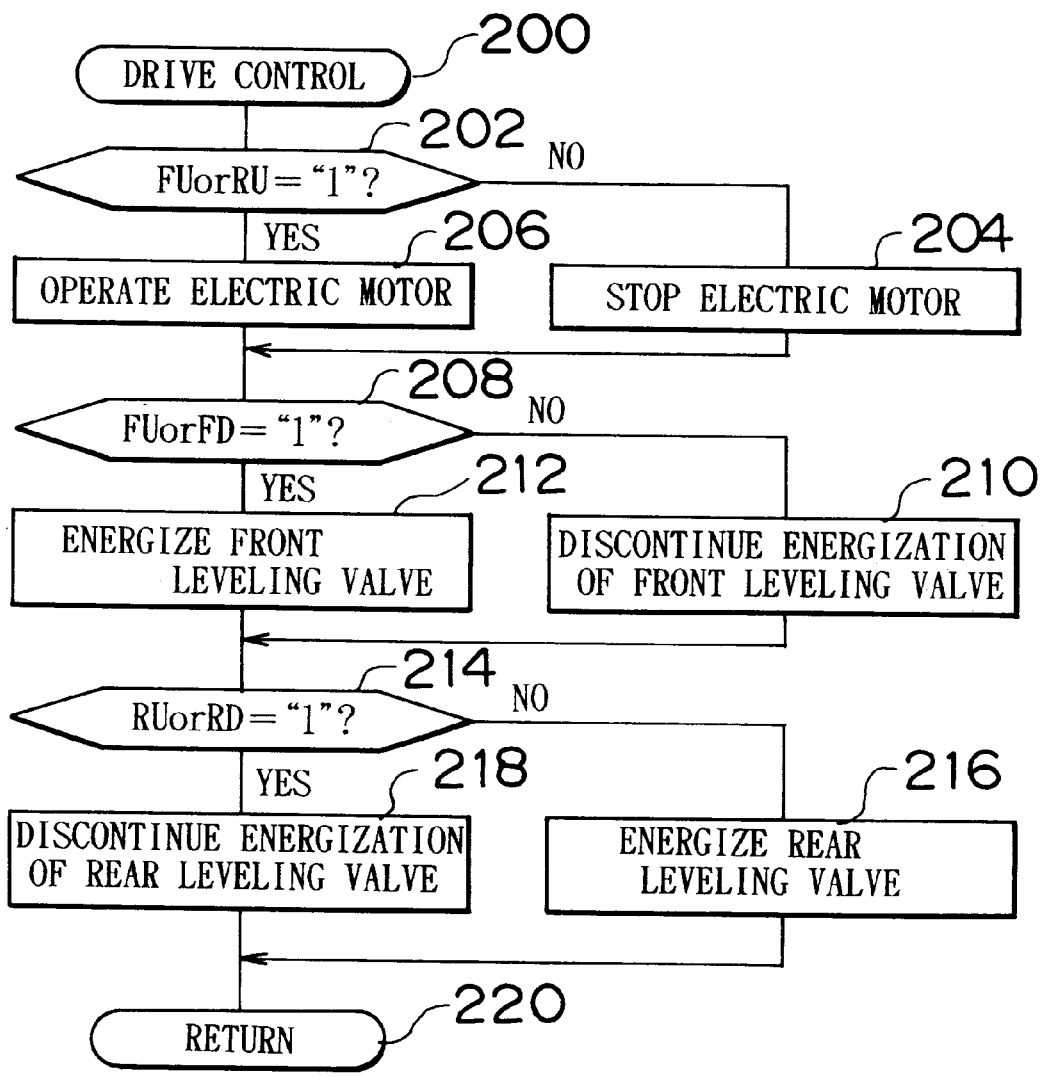

VEHICLE HEIGHT ADJUST CONTROL APPARATUS AND METHOD

BACKGROUND OF THE INVENTION

1. Field of Invention

The present invention relates to a vehicle height adjust control apparatus and method for controlling an actuator while the differential motion between the front and rear wheels is limited and, more particularly, to a vehicle height adjust control apparatus for a vehicle having a drive force distributing device that enables distribution of the drive force to the front and rear wheels while the differential between the front and rear wheels is limited.

2. Description of Related Art

Four-wheel drive vehicles suitable for driving off road or on snow-covered roads or the like are well known wherein the drive force from the transmission is transmitted to the front and rear wheels, as disclosed in, for example, Japanese Patent Application Laid-Open Nos. HEI 2-3508 and HEI 5-58133. Such vehicles typically employ a switching device to simply change between the transmission of the drive force from the transmission only to the rear wheels (or the front wheels) and the transmission thereof to the front and rear wheels, or a differential device having a differential motion limiting function to continuously change the ratio between the drive forces distributed to the front wheels and the rear wheels.

There is another well known technology wherein actuators for changing the vehicle height is provided between the vehicle body and a plurality of wheels so as to change the vehicle height stepwise in accordance with the selection made by a driver, or so as to always maintain a target vehicle height at each wheel position despite changes in the load, or so as to change the vehicle height at each wheel position in accordance with the driving condition of the vehicle, as described in, for example, Japanese Patent Application Laid-Open No. SHO 60-261714 and HEI 2-151515.

However, in such a four-wheel drive vehicle, tight-cornering braking may occur if the vehicle turns in accordance with the operation of the steering wheel while the differential motion between the front and rear wheels is limited so that the revolution speed of the front wheels and the revolution speed of the rear wheels are approximately equal to each other (in particular, while the front and rear wheels are interlocked for equal revolution speeds). Tight-cornering braking occurs due to the inhibition of differential motions between the front and rear wheels. In tight-cornering braking, the wheel base changes due to deformation of bushes and the like, instead of differential motions of the front and rear wheels. Along with wheel base changes during the tight-cornering braking, the vehicle height also changes; for example, the vehicle height at the inner wheel side increases while the vehicle height at the outer wheel side decreases. If an operation is performed to increase the vehicle height in such a condition, the change in the wheel base caused by the change in the vehicle height must be absorbed by a suspension apparatus because of the equal revolution setting on the front and rear wheels. Therefore, considerably great forces are needed to change the vehicle height. When the turning of the vehicle ends, the thus-changed vehicle height needs be re-adjusted. Moreover, during vehicle height adjustment at the end of the turning, a sudden vehicle height change may occur. This is undesirable in view of the driving stability of the vehicle. Furthermore, in this event, unnecessary driving of the actuators for changing the vehicle height inevitably occurs, which is unfavorable in view of the durability of the actuators.

SUMMARY OF THE INVENTION

Accordingly, it is an object of the invention to eliminate the need to re-adjust the height of a vehicle after the vehicle comes out of a turning or cornering state and avoid a sudden vehicle height change after the end of turning so that good vehicle driving will be secured and so that the drive force needed to operate actuators and the frequency of operation thereof will be reduced and therefore the durability or service life of the actuators will be increased, by limiting the vehicle height adjustment when occurrence of the tight-cornering braking is expected.

According to one aspect of the invention, there is provided a vehicle height adjust control apparatus including an actuator capable of changing a vehicle height, a vehicle height detection device that detects a vehicle height, an adjustment control device for adjusting and controlling the vehicle height so that the vehicle height detected by the vehicle height detection device becomes substantially equal to a target vehicle height, by controlling the actuator, and a steering angle detection device that detects a steering angle of a steering wheel. The vehicle height adjustment control by the adjustment control device is limited if the steering angle detected by the steering angle detection device is greater than a predetermined steering angle. A plurality of actuators as described above may be provided between a vehicle body and a plurality of wheels, so as to detect the vehicle heights at the corresponding wheel positions. A plurality of vehicle height detectors may also be provided to detect actual vehicle heights at a plurality of positions.

According to another aspect of the invention, there is provided a vehicle height adjust control apparatus similar to the apparatus described above, wherein the steering angle detection device is replaced by a differential limitation detection device that detects a wheel differential-limited state. The vehicle height adjustment control by the adjustment control device is limited if the wheel differential-limited state is detected by the differential limitation detection device. The differential limitation detection device may detect a state where differential motions between front and rear wheels in a drive force distributor device.

According to still another aspect of the invention, a vehicle height adjust control apparatus similar to the apparatus described above has one or both of a steering angle detection device and a differential limitation detection device. If the steering angle detected by the steering angle detection device is greater than a predetermined steering angle and the wheel differential-limited state is detected by the differential limitation detection device, the vehicle height adjustment control is limited.

The adjustment control device may integrate a deviation of the detected actual vehicle height from a target vehicle height when the deviation exceeds a predetermined threshold, and may start control of the actuator so as to adjust the vehicle height to the target vehicle height, when the integral reaches a predetermined value. The vehicle height adjustment control may be limited by switching the threshold to an increased value.

Furthermore, the vehicle height adjustment control may be limited by stopping the control of the actuator.

In a vehicle height adjust control apparatus according to the invention, a condition where the tight-cornering braking is likely to occur is detected on the basis of the steering angle and/or detection of a differential-limited state. In such a condition, the vehicle height adjustment is limited. Therefore, unnecessary or unfavorable vehicle height changes will be eliminated in a condition that the vehicle height changes due to the tight-cornering braking, in a condition that, due to the tight-cornering braking, great forces will be needed to change the vehicle height, or the like. Consequently, the invention eliminates the need to re-adjust the vehicle height and avoids a sudden vehicle height change after an event of the tight-cornering braking, and avoids a vehicle height change that requires a great force during an event of the tight-cornering braking. As a result, good driving stability of the vehicle is maintained, and the durability or service life of the actuators and the like is increased.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein:

FIG. 5 is a flowchart illustrating a drive control program executed by the microcomputer shown in FIGS. 1 and 2.

DETAILED DESCRIPTION OF PREFERRED EMBODIMENTS

Figure 1:
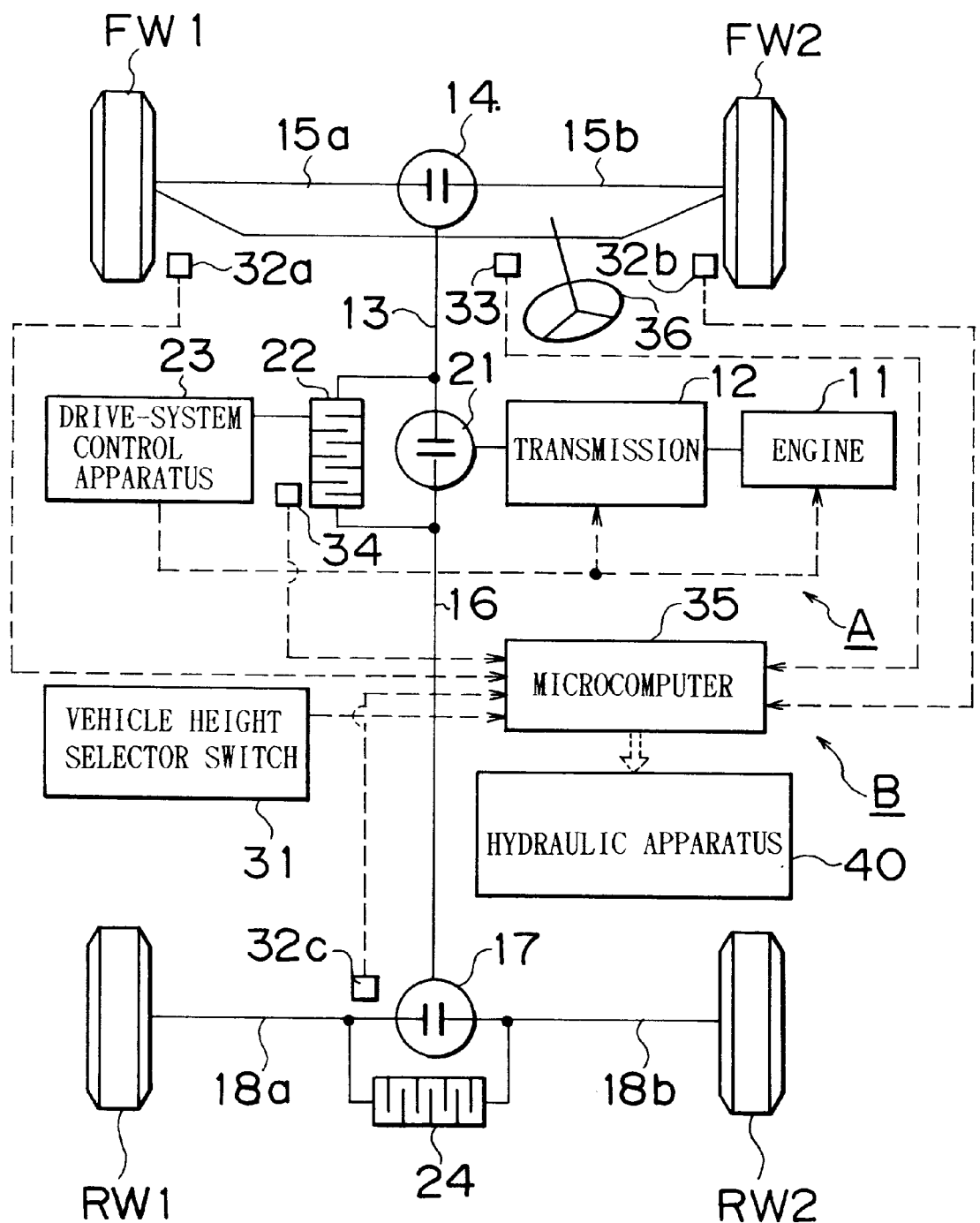
FIG. 1 is a schematic illustration of the overall construction of a vehicle according to a preferred embodiment of the invention.

A preferred embodiment of the present invention will be described in detail hereinafter with reference to the accompanying drawings. FIG. 1 is a schematic illustration of a vehicle equipped with a drive force distributor apparatus A for distributing drive force to left and right front wheels FW1, FW2 and left and right rear wheels RW1, RW2, and a vehicle height adjust apparatus B for adjusting the vehicle height.

The drive force distributor apparatus A has a center differential 21 for transmitting the drive force transmitted thereto from an engine 11 by a transmission 12, to the left and right front wheels FW1, FW2, via a front propeller shaft 13, a front differential 14 and front axle shafts 15a, 15b, and to the left and right rear wheels RW1, RW2, via a rear propeller shaft 16, a rear differential 17 and rear axle shafts 18a, 18b. A wet multiple disc clutch 22 is provided between the front propeller shaft 13 and the rear propeller shaft 16. The wet multiple disc clutch 22 allows the shafts 13, 16 to independently rotate (free state) when the supplied fluid pressure is low. As the supplied fluid pressure increases, the wet multiple disc clutch 22 increases the torque transmitted between the shafts 13, 16, that is, causes the shafts 13, 16 to rotate cooperatively. The fluid pressure supplied to the wet multiple disc clutch 22 is controlled by a drive-system control apparatus 23 having an electric control circuit and a hydraulic circuit. The electric control circuit includes various detectors for detecting driving conditions of the vehicle, and selector switches that are operated by a driver. The electric control circuit controls the engine 11 and the transmission 12, and controls the hydraulic circuit so as to set the fluid pressure supplied to the wet multiple disc clutch 22 to a value in accordance with the detected driving condition of the vehicle and the state selected by the driver. A viscous coupling 24 is provided between the rear axle shafts 18a, 18b. The viscous coupling 24 limits the differential between the revolutions of the left and right rear wheels RW1, RW2, within a predetermined value.

Figure 2:
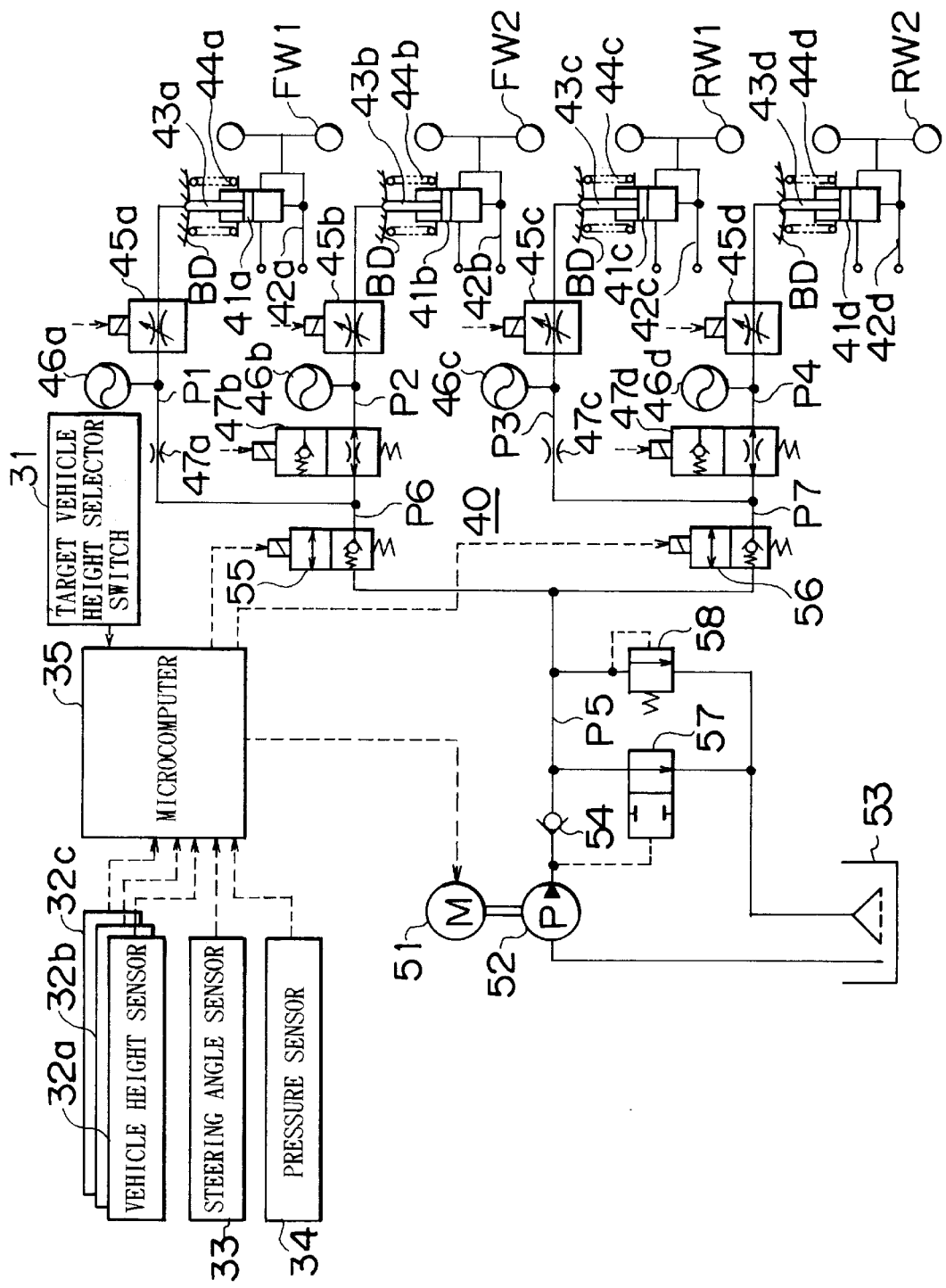
FIG. 2 is a schematic illustration of a vehicle height adjust apparatus shown in FIG. 1.

The vehicle height adjust apparatus B includes a target vehicle height selector switch 31, vehicle height sensors 32a–32c, a steering angle sensor 33, a pressure sensor 34, a microcomputer 35 and a hydraulic apparatus 40, as shown in FIGS. 1 and 2.

The target vehicle height selector switch 31 is a switch that is operated by an occupant to select vehicle heights. The vehicle height sensors 32a, 32b are disposed between the vehicle body BD and lower arms 42a, 42b at the left and right front wheels FW1, FW2, respectively. Each of the vehicle height sensors 32a, 32b detects the height of the vehicle body BD at the left or right front wheel FW1, FW2 relative to a road surface (or an under-spring member), and outputs a detection signal indicating the actual vehicle height Hf1, Hf2. The vehicle height sensor 32c is disposed at a transversely middle position in a rear portion of the vehicle body BD, between the vehicle body BD and a frame (corresponding to an under-spring member not shown) connecting lower arms 42c and 42d. The vehicle height sensor 32c detects the height of the vehicle body BD at the transversely middle position in the rear portion of the vehicle, relative to the road surface (or the under-spring member), and outputs a detection signal indicating the actual vehicle height Hr. The steering angle sensor 33 detects a steering angle θ of a steering wheel 36 in the left and right directions from a reference position (corresponding to the neutral position of the left and right front wheels FW1, FW2), and outputs a detection signal indicating the steering angle θ. The pressure sensor 34 is used to detect a state where the differential motions between the left and right front wheels FW1, FW2 and the left and right rear wheels RW1, RW2 are limited and, in particular, a state where the drive force distributor apparatus A is differential-locked. The pressure sensor 34 detects a fluid pressure P supplied to the wet multiple disc clutch 22 and outputs a detection signal indicating the fluid pressure P.

Figure 3:
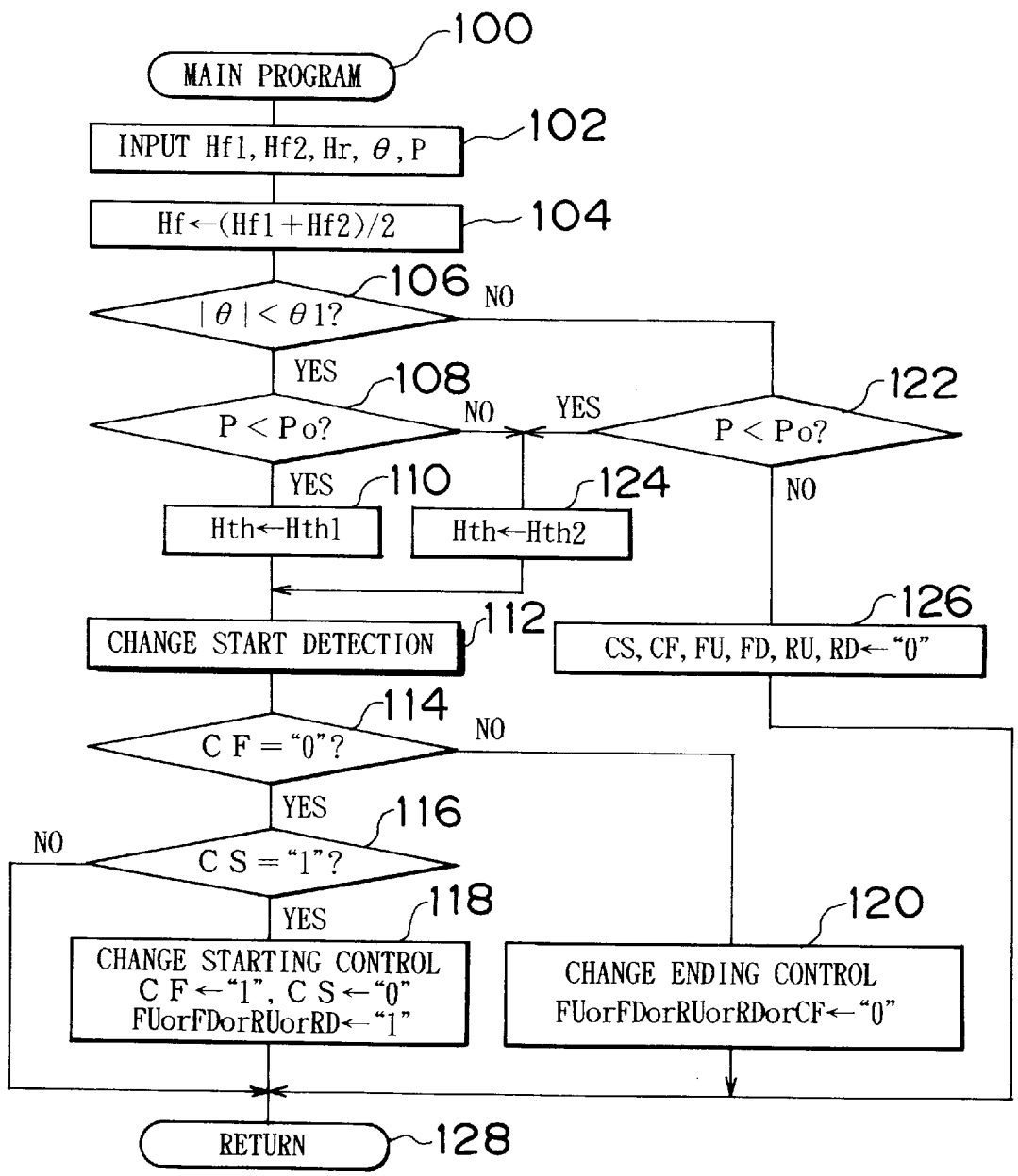
FIG. 3 is a flowchart illustrating a main program executed by the microcomputer shown in FIGS. 1 and 2.

The microcomputer 35 has a built-in timer circuit, and executes a main program illustrated in FIG. 3 (including a change start detecting routine illustrated in FIG. 4) and a drive control program illustrated in FIG. 5 repeatedly every predetermined short time, thereby controlling the hydraulic apparatus 40 so as to set the vehicle height to a predetermined value.

The hydraulic apparatus 40 has hydraulic cylinders 41a–41d that form hydraulic actuators for setting vehicle heights, near the left and right front wheels FW1, FW2 and the left and right rear wheels RW1, RW2, respectively. Each of the hydraulic cylinders 41a–41d is connected at its lower end to a lower arm 42a–42d connecting to the corresponding one of the wheels FW1, FW2, RW1, RW2. A piston rod 43a–43d of each hydraulic cylinder 41a–41d protrudes from an upper surface thereof. Upper end portions of the piston rods 43a–43d are fixed to the vehicle body BD. Hydraulic fluid is supplied to and discharged from the hydraulic cylinders 41a–41d through fluid passages P1–P4, respectively. In accordance with supply and discharge of hydraulic fluid, the hydraulic cylinders 41a–41d change the vehicle height at the respective wheel positions.

Coil springs 44a–44d are disposed between the vehicle body BD and the hydraulic cylinders 41a–41d, respectively. The fluid passages P1–P4 are provided with variable orifices 45a–45d, respectively. Accumulators 46a–46d are connected to the fluid passages P1–P4, respectively. In cooperation with the coil springs 44a–44d, the variable orifices 45a–45d and the accumulators 46a–46d, the hydraulic cylinders 41a–41d elastically support the vehicle body BD relative to the wheels FW1, FW2, RW1, RW2, and also function as shock absorbers for damping oscillations of the vehicle body BD. The variable orifices 45a–45d are electrically controlled so as to vary their orifice openings. The control of the orifice openings of the variable orifices 45a–45d is not directly related to the invention, and will not be described.

The fluid passages P1, P2 and the fluid passages P3, P4 are connected, at their ends opposite from the hydraulic cylinders 41a, 41b and 41c, 41d, to common fluid passages, respectively. Therefore, hydraulic fluid is collectively supplied to and discharged from the hydraulic cylinders 41a, 41b through the fluid passages P1, P2, and hydraulic fluid is collectively supplied to and discharged from the hydraulic cylinders 41c, 41d through the fluid passages P3, P4. The fluid passages P2, P4 are provided with gate valves 47b, 47d formed by electromagnetic valves, respectively. The gate valves 47b, 47d are in a conveying state as indicated in FIG. 2 when not energized, and they are switched to a non-conveying state when energized. The gate valves 47b, 47d are energized when the vehicle body BD considerably rolls, so as to prevent communication between the hydraulic cylinders 41a and 41b and communication between the hydraulic cylinders 41c and 41d, respectively. The operation of the gate valves 47b, 47d is not directly relevant to the invention, and the description below will be made on assumption that the gate valves 47b, 47d are always in the conveying state as indicated in FIG. 2. The fluid passages P1, P3 are provided with invariable orifices 47a, 47c, respectively, for providing the fluid passages P1, P3 with a passage resistance equivalent to that provided by orifice openings that are formed by the gate valves 47b, 47d when in the conveying state.

A hydraulic pressure supply-discharge device for supplying hydraulic fluid to and discharging it from the fluid passages P1–P4 has a hydraulic pump 52 that is driven by an electric motor 51. The electric motor 51 is drive-controlled by the microcomputer 35. The hydraulic pump 52 draws hydraulic fluid from a reservoir tank 53, and ejects it into a fluid passage P5 through a check valve 54. The fluid passage P5 divides into fluid passages P6, P7. The branch fluid passage P6 is connected to the connecting point of the fluid passages P1, P2. The branch fluid passage P7 is connected to the connecting point of the fluid passages P3, P4. The fluid passages P6, P7 are provided with leveling valves 55,56 that are formed by electromagnetic valves. The leveling valves 55,56 are controlled by the microcomputer 35. The leveling valves 55,56 remain in a non-conveying state as indicated in FIG. 2 when not energized, and they are switched to a conveying state when energized. If the hydraulic pressure in the fluid passages P1–P4 becomes abnormally high, the leveling valves 55,56 allow discharge of hydraulic fluid from the fluid passages P1–P4 into the fluid passage P5 for protection of the apparatus even while they are in the non-conveying state.

A discharge valve 57 and a relief valve 58 are disposed between the fluid passage P5 and the reservoir tank 53. The discharge valve 57 is normally kept in a conveying state as indicated in FIG. 2, and mechanically switched to a non-conveying state when an ejecting pressure is supplied thereto by the hydraulic pump 52. The passage area of the discharge valve 57 when the discharge valve 57 is kept in the conveying state is at least twice as large as the passage area of the leveling valves 55,56 when they are in the conveying state. The relief valve 58 is normally kept in a non-conveying state as indicated in FIG. 2. Only when the hydraulic pressure in the fluid passage P5 becomes very high, the relief valve 58 is switched to a conveying state to let hydraulic fluid out of the fluid passage P5 into the reservoir tank 53 for protection of the apparatus.

The operation of the thus-constructed embodiment will be described. When the ignition switch (not shown) is turned on, the microcomputer 35 executes a program (not illustrated) to initially set "0" in various flags used in programs described below, and then starts to execute the main program illustrated in FIG. 3 and the drive control program illustrated in FIG. 5 repeatedly every predetermined short period.

When the main program is started in step 100, the microcomputer 35 receives inputs of detection signals from the vehicle height sensors 32a–32c, the steering angle sensor 33 and the pressure sensor 34 indicating the actual vehicle heights Hf1, Hf2, Hr, the steering angle θ and the pressure P in step 102. If the actual vehicle heights Hf1, Hf2, Hr, the steering angle θ and the pressure P from the sensors 32a–32c, 33,34 have instantaneous changes and therefore are not suitable for direct use in the operations by the microcomputer 35, the signals of the actual vehicle heights Hf1, Hf2, Hr, the steering angle θ and the pressure P are subjected to low-pass filter processing.

Subsequently in step 104, the microcomputer 35 calculates an actual vehicle height $Hf(=(Hf1+Hf2)/2)$ of a front portion of the vehicle body BD by averaging the actual vehicle heights Hf1, Hf2. In step 106, the microcomputer 35 determines whether the absolute value |θ| of the steering angle θ is less than a relatively large predetermined steering angle θ1. If the steering wheel 36 is not considerably rotated, that is, if the absolute value |θ| is less than the predetermined steering angle θ1, the microcomputer 35 makes an affirmative determination (YES) in step 106, and then determines in step 108 whether the fluid pressure P is less than a relatively large predetermined fluid pressure P0. The predetermined fluid pressure P0 is predetermined such that if the fluid pressure P in the wet multiple disc clutch 22 becomes equal to or higher than the predetermined fluid pressure P0, the drive force distributor apparatus A is set to a differential-locked state. If the fluid pressure P is less than the predetermined fluid pressure P0, the microcomputer 35 makes affirmative determination in step 108, and, in step 110, sets a relative small value Hth1 as a threshold Hth that is used in an accumulating operation (integration) for detecting a change in the vehicle height as described below. After step 110, the accumulator 25 executes a change start detecting routine in step 112.

Figure 4:
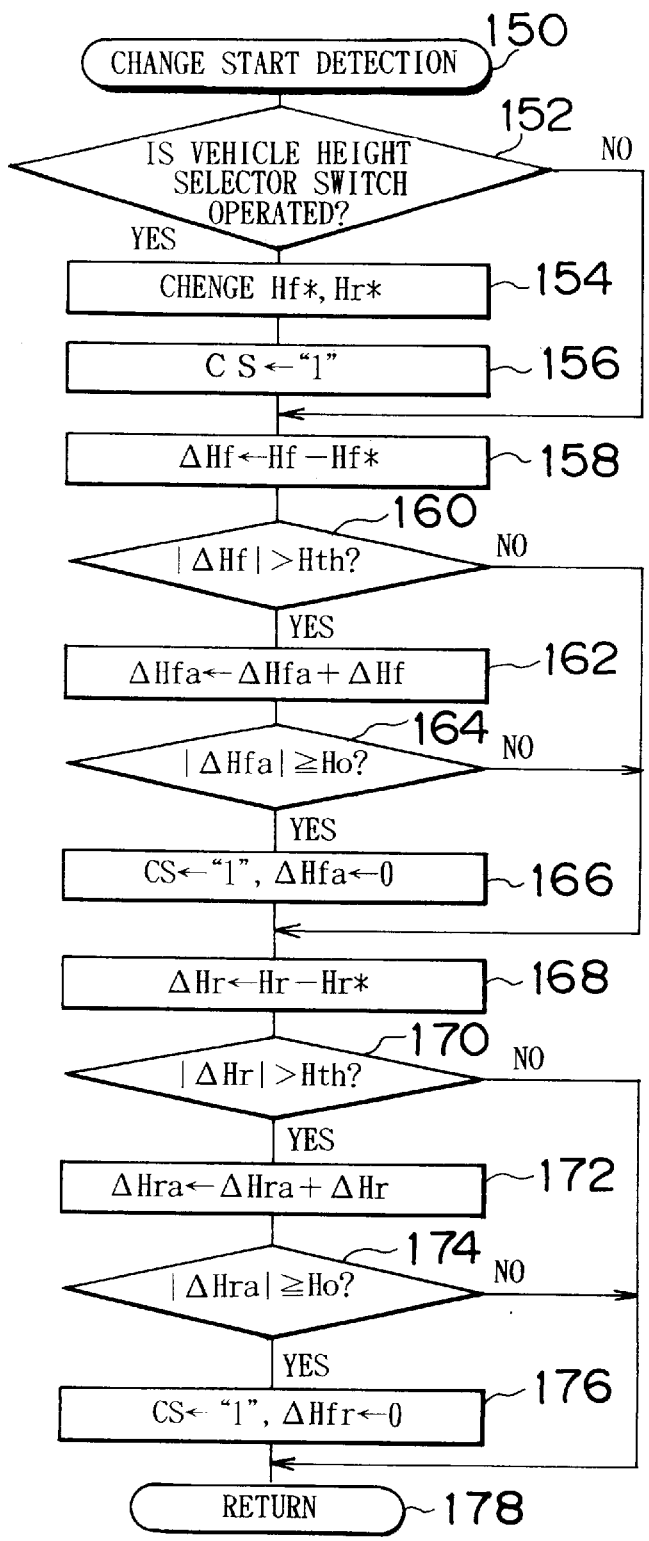
FIG. 4 is a detailed flowchart of the change start detecting routine indicated in FIG. 3.

The change start detecting routine is illustrated in detail in FIG. 4. When the execution of the routine is started in step 150, the microcomputer 35 determines in step 152 whether the target vehicle height selector switch 31 has been operated. If the target vehicle height selector switch 31 has not been operated, the microcomputer 35 makes a negative determination (NO) in step 152, and proceeds to step 158. In step 158, a vehicle height deviation $\Delta Hf(=Hf-Hf^*)$ is calculated by subtracting the target vehicle height Hf* of the front portion of the vehicle body BD from the actual vehicle height Hf of the front portion thereof detected in step 104. The target vehicle height Hf* is selected by operating the target vehicle height selector switch 31. The target vehicle height Hf* is initially set to a value corresponding to the state of the target vehicle height selector switch 31 at the time of the turning-on of the ignition switch, by the execution of the program (not shown). If the absolute value |ΔHf| of the vehicle height deviation ΔHf is equal to or less than the threshold Hth set in step 110, the microcomputer 35 makes a negative determination in step 160, and proceeds to step 168.

In step 168, a vehicle height deviation ΔHr(=Hr−Hr*) is calculated by subtracting the target vehicle height Hr* of the rear portion of the vehicle body BD from the actual vehicle height Hr of the rear portion thereof detected in step 102. The target vehicle height Hr* is set simultaneously with the target vehicle height Hf* of the front portion. If the absolute value ΔHr of the vehicle height deviation ΔHr is equal to or less than the threshold Hth set in step 110, the microcomputer 35 makes a negative determination in step 170, and ends the execution of the change start detecting routine in step 178.

When the change start detecting routine is ended in this manner, the microcomputer 35 then determines in step 114 in FIG. 3 whether a changing flag CF is "0". If it is "0", the microcomputer 35 determines in step 116 whether a change start flag CS is "1". The changing flag CF and the change start flag CS are initially set to "0" by the initial setting operation as described above. Therefore, the microcomputer 35 makes an affirmative determination in step 114 and negative determination in step 116, and then temporarily ends the execution of the main program in step 128.

In addition to the execution of the main program, the microcomputer 35 executes the drive control program illustrated in FIG. 5. When the execution of the drive control program is started in step 200, the process of steps 202 through 218 controls the electric motor 51 and the leveling valves 55,56 corresponding to the set states of a front raising flag FU, a front lowering flag FD, a rear raising flag RU and a rear lowering flag RD. These flags indicate performance of the raising and lowering controls of the front and rear portions of the vehicle body BD, respectively. In this case, since the flags FU, FD, RU, RD are kept at "0" by the initial setting, the microcomputer 35 stops the electric motor 51 by the process of steps 202, 204, and sets the leveling valve 55 to the non-energized state by the process of steps 208,210, and sets the leveling valve 56 to the non-energized state by the process of steps 214,216. As a result, the hydraulic pressure in the hydraulic cylinders 41a, 41b is maintained, and the hydraulic pressure in the hydraulic cylinders 41c, 41d is maintained, so that the vehicle heights of the front and rear portions of the vehicle body BD are maintained at levels where they have been.

Next described will be the operation wherein the vehicle height is changed when the absolute value |θ| of the steering angle θ is less than the predetermined steering angle θ1 and the fluid pressure P is less than the predetermined fluid pressure P0. The vehicle height is changed in the following cases: a first case where the driver operates the target vehicle height selector switch 31; and a second case where the load is changed so that the actual vehicle heights Hf, Hr of the front and rear portions of the vehicle body BD are changed.

In the first case, an operation is performed as follows. When the driver operates the target vehicle height selector switch 31, the microcomputer 35 makes an affirmative determination in step 152 in the change start detecting routine of FIG. 4 and, in step 154, changes the target vehicle heights Hf*, Hr* of the front and rear portions of the vehicle body BD to values corresponding to the switched state of the target vehicle height selector switch 31. Subsequently in step 156, the change start flag CS is set to "1".

In the second case, an operation is performed as follows. When the actual vehicle height Hf of the front portion of the vehicle body BD is changed so that the absolute value |ΔHf| of the vehicle height deviation ΔHf becomes greater than the threshold Hth, the microcomputer 35 makes an affirmative determination in step 160. Subsequently in step 162, the microcomputer 35 calculates an accumulated value ΔHfa of vehicle height deviations ΔHf by performing an arithmetic operation represented by expression 1.

$$\Delta Hfa = \Delta Hfa + \Delta Hf \quad (1)$$

Until the absolute value |ΔHfa| of the accumulated value ΔHfa becomes equal to or greater than a predetermined value ΔH0, the microcomputer 35 repeatedly makes a negative determination in step S164. Because the accumulated value ΔHfa is initially cleared to zero and because step 164 is executed every predetermined time, the accumulated value ΔHfa is substantially equivalent to the integral of the vehicle height deviation ΔHf (the amount of deviation of the actual vehicle height Hf from the target vehicle height Hf*). If the absolute value |ΔHfa| of the accumulated value ΔHfa becomes equal to or greater than the predetermined value ΔH0, the microcomputer 35 makes an affirmative determination in step 164. Then in step 166, the microcomputer 35 sets the change start flag CS to "1", and clears the accumulated value ΔHfa to zero.

In the process of steps 170, 172, if the actual vehicle height Hr of the rear portion of the vehicle body BD is changed, substantially the same operation as described above is performed. That is, if the absolute value |ΔHr| of the vehicle height deviation ΔHr of the rear portion becomes greater than the threshold Hth, the microcomputer 35 accumulates (integrates) vehicle height deviations ΔHr by performing an arithmetic operation represented by expression 2.

$$\Delta Hra = \Delta Hra + \Delta Hr \quad (2)$$

In the process of steps 174, 176, when the absolute value |ΔHra| of the accumulated value (integral) ΔHra becomes equal to or greater than the predetermined value ΔH0, the change start flag CS is set to "1" and the accumulated value ΔHra is cleared to zero.

When the change start flag CS has been set to "1" in this manner, the microcomputer 35 makes an affirmative determination in step 116, and then executes a change starting control routine in step 118. In the change starting control routine, the changing flag CF is set to "1", and the change start flag CS is set back to "0", and one or two of the front raising flag FU, the front lowering flag FD, the rear raising flag RU and the rear lowering flag RD are set to "1". More specifically, in a case where the target vehicle height selector switch 31 is operated so that both actual vehicle heights Hf, Hr of the front and rear portions of the vehicle body BD that were previously set now considerably deviate upward or downward from the selected target vehicle heights Hf*, Hr*, or in a case where the load of the entire vehicle body BD is changed so that both actual vehicle heights Hf, Hr considerably deviate upward or downward from the target vehicle heights Hf*, Hr*, the front raising flag FU and the rear raising flag RU are set to "1" and the front lowering flag FD and the rear lowering flag RD are maintained at "0"; alternatively, the front lowering flag FD and the rear lowering flag RD are set to "1" and the front raising flag FU and the rear raising flag RU are maintained at "0". If only one of the actual vehicle heights Hf, Hr deviates upward or downward due to a change in the weight of a portion of the vehicle body BD, one of the front raising flag FU, the front lowering flag FD, the rear raising flag RU and the rear lowering flag RD is set to "1", and the other flags are maintained at "0". In this operation, it never happens that the front raising flag FU or the rear raising flag RU and the front lowering flag FD or the rear lowering flag RD are simultaneously set to "1".

When the drive control program of FIG. 5 is executed in the conditions as described above, the electric motor 51 is driven by the process of steps 202, 206 if both or one of the front raising flag FU and the rear raising flag RU is set to "1". Therefore, the hydraulic pump 52 draws hydraulic fluid from the reservoir 53 and ejects it into the fluid passage P5. In response to the ejecting fluid pressure, the discharge valve 57 is switched to the nonconveying state. If the front raising flag FU is "1", the leveling valve 55 is energized by the process of steps 208, 212, so that hydraulic fluid, ejected by the hydraulic pump 52, is supplied to the hydraulic cylinders 41a, 41b through the fluid passages P6, P1, P2. Therefore, the hydraulic cylinders 41a, 41b start to raise the positions of the vehicle body BD corresponding to the left and right front wheels FW1, FW2. If the rear raising flag RU is "1", the leveling valve 56 is energized by the process of steps 214, 218, so that hydraulic fluid, ejected by the hydraulic pump 52, is supplied to the hydraulic cylinders 41c, 41d through the fluid passages P7, P3, P4. Therefore, the hydraulic cylinders 41c, 41d start to raise the positions of the vehicle body BD corresponding to the left and right rear wheels RW1, RW2.

Conversely, if both or one of the front lowering flag FD and the rear lowering flag RD is set to "1", the electric motor 51 is stopped by the process of steps 202,204 since the front raising flag FU and the rear raising flag RU are maintained at "0". Therefore, the hydraulic pump 52 does not eject hydraulic fluid, so that the discharge valve 57 is maintained in the conveying state. If the front lowering flag FD is "1", the leveling valve 55 is energized by the process of steps 208,212, so that hydraulic fluid is discharged from the hydraulic cylinders 41a, 41b into the reservoir 53 through the fluid passages P1, P2, P6, P5 and the discharge valve 57. Therefore, the positions of the vehicle body BD corresponding to the left and right front wheels FW1, FW2 start to lower. If the rear lowering flag RD is "1", the leveling valve 56 is energized by the process of steps 214,218, so that hydraulic fluid is discharged from the hydraulic cylinders 41c, 41d into the reservoir 53 through the fluid passages P3, P4, P7, P5 and the discharge valve 57. Therefore, the positions of the vehicle body BD corresponding to the left and right rear wheels RW1, RW2 start to lower.

When the entire vehicle body BD or a portion thereof starts to rise or lower through the operation described above, the microcomputer 35 makes a negative determination in step 114 since the changing flag CF has been set to "1" by the execution of step 118. Therefore, the microcomputer 35 starts executing a change ending control routine in step 120. In the change ending control routine, the microcomputer 35 compares the target vehicle heights Hf*, Hr* and the actual vehicle heights Hf, Hr of the front and rear portions of vehicle body BD while the vehicle height is being increased or reduced. When the actual vehicle height Hf becomes substantially equal to the target vehicle height Hf* or when the actual vehicle height Hr becomes substantially equal to the target vehicle height Hr*, the corresponding one of the flags FU, FD, RU and RD, that is, the flag corresponding to the actual vehicle height Hf or Hr that has substantially reached the target vehicle height Hf* or Hr*, is set back to "0". When all the flags FU, FD, RU and RD have been set back to "0", the changing flag CF is set back to "0". In short, if both the front raising flag FU and the rear raising flag RU are set to "1", or if both the front lowering flag FD and the rear lowering flag RD are set to "1", only the flag regarding the portion of the vehicle body BD where the actual vehicle height Hf or Hr has become substantially equal to the target vehicle height Hf* or Hr* is set back to "0", while the flag regarding the portion where the actual vehicle height Hf or Hr has not become substantially equal to the target vehicle height Hf* or Hr* is maintained at "1". After the actual vehicle heights Hf and Hr of the front and rear portions of the vehicle body BD have become substantially equal to the respective target vehicle heights Hf* and Hr*, the changing flag CF is set back to "0". In this operation, if both actual vehicle heights Hf, Hr of the front and rear portions of the vehicle body BD have simultaneously become substantially equal to the respective target vehicle heights Hf*, Hr*, both flags are immediately set back to "0", and the changing flag CF is also set back to "0".

After all of the front raising flag FU, the front lowering flag FD, the rear raising flag RU and the rear lowering flag RD have been set back to "0", the vehicle heights of the vehicle body BD at the individual wheel positions are maintained at the target vehicle heights by execution of the drive control program of FIG. 5, as in the initial operation described above.

Next described will be an operation performed in a case where the vehicle enters a sharp turning condition, or in a case where the drive force distributor apparatus A is set to the differential-locked state. If the steering wheel 36 is turned to a great rotational angle so that the absolute value $|\theta|$ of the steering angle $\theta$ becomes equal to or greater than the predetermined steering angle $\theta 1$, the microcomputer 35 makes a negative determination in step 106 in the main program of FIG. 3, and proceeds to step 122. The processing in step 122 is substantially the same as the processing in step 108. If the fluid pressure P is less than the predetermined fluid pressure P0, the microcomputer 35 makes an affirmative determination in step 122, and proceeds to step 124. In a case where the absolute value $|\theta|$ of the steering angle $\theta$ is less than the predetermined steering angle $\theta 1$ and where the drive force distributor apparatus A is in the differential-locked state so that the fluid pressure P becomes equal to or greater than the predetermined fluid pressure P0, the microcomputer 35 makes an affirmative determination in step 106 and a negative determination in step 108, and then proceeds to step 124.

In step 124, the threshold Hth, used for the accumulation (integration) for detecting a change in the vehicle height as described above, is set to a predetermined value Hth2 (Hth2>Hth1) that is greater than the predetermined value Hth1 used in step 110. Therefore, in steps 160, 170 of the change start detecting routine of FIG. 4, it becomes less likely to determine that the absolute value $|\Delta Hf|$ or $|\Delta Hr|$ of the vehicle height deviation $\Delta Hf$ or $\Delta Hr$ has become equal to or greater than the threshold Hth even if the actual vehicle heights Hf, Hr of the front and rear portions of the vehicle body BD change to some extent, so that the changes in the accumulated values (integrals) $\Delta Hfa$, $\Delta Hra$ are reduced. Consequently, it becomes less likely that the absolute values $|\Delta Hfa|$, $|\Delta Hra|$ of the accumulated values $\Delta Hfa$, $\Delta Hra$ will become equal to or greater than the predetermined value $\Delta H0$. This means that the detection of changes in the actual vehicle heights Hf,Hr of the front and rear portions of the vehicle body BD in the process of steps 158 through 166 and the process of steps 168 through 176 is made less sensitive so as to restrict the setting of the change start flag CS, that is, the vehicle height adjustment control of steps 114–118, 120 of the main program of FIG. 3 is restricted.

As a result, the vehicle height adjustment is restricted in advance if a possibility arises that the tight-cornering braking will occur, for example, in a case where the vehicle enters a sharp turning condition or in a case where the drive force distributor apparatus A is set to the differential-locked state. Therefore, unnecessary or unfavorable vehicle height changes will be eliminated in a condition that the vehicle height changes due to the tight-cornering braking, in a condition that, due to the tight-cornering braking, great forces will be needed to change the vehicle height, or the like. Consequently, the embodiment eliminates the need to re-adjust the vehicle height and avoids a sudden vehicle height change after an event of the tight-cornering braking, and avoids a vehicle height change that requires a great force during an event of the tight-cornering braking. As a result, good driving stability of the vehicle is maintained, and the durability or service life of the hydraulic pump 52, the leveling valves 55, 56, the hydraulic cylinders 41a–41d and the like is increased.

Next described will be an operation performed in a condition that the vehicle has entered a sharp turning condition and that the drive force distributor apparatus A has been set to the differential-locked state. In this case, the absolute value |θ| of the steering angle θ becomes equal to or greater than the predetermined steering angle θ1 and the fluid pressure P becomes equal to or greater than the predetermined fluid pressure P0, so that the microcomputer 35 makes a negative determination in steps 106, 122 of the main program of FIG. 3, and then proceeds to step 126. In step 126, the change start flag CS, the changing flag CF, the front raising flag FU, the front lowering flag FD, the rear raising flag RU and the rear lowering flag RD are forcibly set to "0". As long as the aforementioned condition continues, the processing of step 126 is repeatedly executed. As a result, when the drive control program of FIG. 5 is executed, the electric motor 51 is stopped by the process of steps 202, 204, and the leveling valves 55,56 are set to the non-energized state by the process of steps 208, 210, 214, 216. Therefore, the hydraulic fluid in the hydraulic cylinders 41a–41d is maintained in a condition where it has been.

Through the aforementioned operation, the aforementioned problems related to the tight-cornering braking are reliably avoided, also in a case where the vehicle has entered a sharp cornering condition and the drive force distributor apparatus A has been set to the differential-locked state, so that the possibility of occurrence of the tight-cornering braking has increased. Therefore, good driving stability of the vehicle is maintained, and the durability or service life of the hydraulic pump 52, the leveling valves 55,56, the hydraulic cylinders 41a–41d and the like is increased.

In the foregoing embodiment, if only one of the sharp cornering condition of the vehicle and the differential-locked state of the drive force distributor apparatus A is detected, the vehicle height adjustment control is partially restricted by setting the threshold Hth of the vehicle height deviations ΔHf, ΔHr to an increased value. In such a case, however, it is also possible to entirely stop the vehicle height adjustment control. The entire stop of the vehicle height adjustment control may be achieved by a control procedure wherein the determining processings of steps 122, 124 in FIG. 3 are eliminated and the negative determination in step 106 or 108 is followed by step 126. In the case where both the sharp cornering condition of the vehicle and the differential-locked state of the drive force distributor apparatus A are detected, it is also possible to partially restrict the vehicle height adjustment control instead of entirely stopping the vehicle height adjustment control, by setting the threshold Hth of the vehicle height deviations ΔHf, ΔHr to an increased value. This manner of control may be achieved by a procedure where steps 122, 126 are eliminated and the negative determination in step 106 or 108 is followed by step 124. In a further modification, only one of the sharp cornering condition of the vehicle and the differential-locked state of the drive force distributor apparatus A is monitored and detected and, simultaneously with the detection, the vehicle height adjustment control is stopped, or partially restricted. In a possible procedure for this modification, the determining processings of steps 108, 122 are eliminated, and one of steps 124, 126 is eliminated, and the negative determination in step 106 is followed by the other one of steps 124, 126. It is also possible to employ a control procedure where the determining processings of steps 106, 122 are eliminated, and one of steps 124, 126 is eliminated, and the negative determination in step 108 is followed by the other one of steps 124, 126.

Although the foregoing embodiment determines that the drive force distributor apparatus A is substantially in the differential-locked state on the basis of determination that the fluid pressure P has become equal to or greater than the relatively large predetermined fluid pressure P0, and restricts the vehicle height adjustment control by the processings of steps 124, 126, it is also possible to set the predetermined fluid pressure P0 to a value that is less than the aforementioned values, and to restrict the vehicle height adjustment control when the drive force distributor apparatus A limits the ratio of drive forces distributed to the front wheels FW1, FW2 and the rear wheels RW1, RW2 to a suitable value. Furthermore, instead of detecting the differential-locked state based on the fluid pressure P, it is also possible to detect a differential limited state, including the differential-locked state, on the basis of a signal from the electric control circuit in the drive-system control apparatus 23.

Although in the foregoing embodiment, the same threshold Hth (=Hth2) is used for the sharp cornering state of the vehicle and the differential-locked state of the drive force distributor apparatus A, it is also possible to use different thresholds for the two states. Furthermore, the threshold Hth may be gradually increased as the fluid pressure P and the steering angle θ increase, whereby the vehicle height adjustment will be restricted to a plurality of levels.

Although in the foregoing embodiment, the two vehicle height sensors are provided in the front portion of the vehicle body BD and one vehicle height sensor is provided in the rear portion thereof, it is also possible to provide one vehicle height sensor in each of the front and rear portions of the vehicle body BD and to detect the actual vehicle heights Hf, Hr of the front and rear portions of the vehicle body BD of the vehicle body BD using the respective sensors. It is also possible to provide one vehicle height sensor at each of the left and right rear wheels RW1, RW2, and to detect the vehicle height of the rear portion of the vehicle body BD by averaging the vehicle heights detected by the two sensors. Furthermore, although the foregoing embodiment performs control such that the actual vehicle heights Hf, Hr of the front and rear portions of the vehicle body BD are set to the respective target vehicle heights Hf*, Hr*, it is also possible to set the vehicle heights of the vehicle body BD at the individual wheel positions to their respective target vehicle heights.

Although in the foregoing embodiment, the invention is applied to a vehicle having a drive force distributor apparatus capable of continuously varying the ratio of the drive forces distributed to the left and right front wheels FW1, FW2 and the left and right rear wheels RW1, RW2, the invention may also be applied to a vehicle capable of selectively switching between the supply of drive force exclusively to the left and right front wheels FW1, FW2 or exclusively to the left and right rear wheels RW1, RW2, and the distribution of drive force to the left and right front wheels FW1, FW2 and the left and right rear wheels RW1, RW2 in a condition that the differential motions between the left and right front wheels FW1, FW2 and the left and right rear wheels RW1, RW2 are limited (e.g., equal revolution speeds of the left and right front wheels FW1, FW2 and the left and right rear wheels RW1, RW2 are maintained). In this application, the vehicle height adjustment may be restricted when the differential is limited.

Although in the foregoing embodiment, the invention is applied to a hydraulic vehicle height adjust apparatus B, the invention may also be applied to vehicle height adjust apparatuses employing other types of fluids, for example, a pneumatic vehicle height adjust apparatus using air. In the application to a pneumatic vehicle height adjust apparatus, the hydraulic pump 52 and the hydraulic cylinder 41a–41d are replaced by a pneumatic pump and pneumatic cylinders, and the various valves 55–58 are also replaced by pneumatic valves.

While the present invention has been described with reference to what is presently considered to be a preferred embodiment thereof, it is to be understood that the invention is not limited to the disclosed embodiment or constructions. To the contrary, the invention is intended to cover various modifications and equivalent arrangements.

What is claimed is:

1. A vehicle height adjust control apparatus comprising:
   an actuator capable of changing a vehicle height;
   a vehicle height detector that detects the vehicle height;
   adjustment control means for adjusting and controlling the vehicle height so that the vehicle height detected by the vehicle height detector becomes substantially equal to a target vehicle height, by controlling the actuator wherein the adjustment control means starts control of the actuator if a deviation of the vehicle height detect by the vehicle height detector from the target vehicle height exceed a predetermined threshold; and
   a steering angle detector that detects a steering angle of a steering wheel,
   wherein vehicle height adjustment control is limited if the steering angle detected by the steering angle detector is greater than a predetermined steering angle and the vehicle height adjustment control is also limited by switching the threshold to an increased value.

2. A vehicle height adjust control apparatus comprising:
   an actuator capable of changing a vehicle height;
   a vehicle height detector that detects a vehicle height;
   adjustment control means for adjusting and controlling the vehicle height so that the vehicle height detected by the vehicle height detector becomes substantially equal to a target vehicle height, by controlling the actuator; and
   a differential limitation detect that detects a wheel differential-limited state,
   wherein vehicle height adjustment control is limited if the wheel differential-limited state is detected by the differential limitation detector means.

3. A vehicle height adjust control apparatus according to claim 2, wherein the adjustment control means starts control of the actuator if a deviation of the vehicle height detected by the vehicle height detector from the target vehicle height exceeds a predetermined threshold.

4. A vehicle height adjust control apparatus according to claim 3, wherein the vehicle height adjustment control is limited by switching the threshold to an increased value.

5. A vehicle height adjust control apparatus according to claim 3, wherein the vehicle height adjustment control is limited by stopping the control of the actuator.

6. A vehicle height adjust control apparatus according to claim 2, wherein the adjustment control means starts control of the actuator if an integral of a deviation of the actual vehicle height detected by the vehicle height detector from the target vehicle height reaches a predetermined value.

7. A vehicle height adjust control apparatus comprising:
   an actuator capable of changing a vehicle height;
   a vehicle height detector that detects a vehicle height;
   adjustment control means for adjusting and controlling the vehicle height so that the vehicle height detected by the vehicle height detector becomes substantially equal to a target vehicle height, by controlling the actuator;
   a steering angle detector that detects a steering angle of a steering wheel; and
   a differential limitation detector that detects a wheel differential-limited state,
   wherein vehicle height adjustment control is limited provided that the steering angle detected by the steering angle detector means is greater than a predetermined steering angle and that the wheel differential-limited state is detected by the differential limitation detector.

8. A vehicle height adjust control apparatus according to claim 7, wherein the adjustment control means starts control of the actuator if a deviation of the vehicle height detected by the vehicle height detector from the target vehicle height exceeds a predetermined threshold.

9. A vehicle height adjust control apparatus according to claim 8, wherein the vehicle height adjustment control is limited by switching the threshold to an increased value.

10. A vehicle height adjust control apparatus according to claim 8, wherein the vehicle height adjustment control is limited by stopping the control of the actuator.

11. A vehicle height adjust control apparatus according to claim 8, wherein the threshold is set so as to vary as the steering angle changes.

12. A vehicle height adjust control apparatus according to claim 7, wherein the adjustment control means starts control of the actuator if an integral of a deviation of the actual vehicle height detected by the vehicle height detector from the target vehicle height reaches a predetermined value.

13. A method of controlling a vehicle height adjust apparatus for a vehicle that includes an actuator capable of changing a vehicle height, a height detector that detects the vehicle height and a controller linked to the actuator that receives parameters indicating a state of the vehicle, the method comprising:
   detecting the vehicle height and at least one of a steering angle of a steering wheel of the vehicle and a differential-limited state of wheels of the vehicle; and
   controlling the actuator with the controller to adjust the vehicle height to approach the target vehicle height if the detected steering angle is not greater than a predetermined steering angle and the wheels are not in a differential-limited state.

14. The method of claim 13, further comprising determining a deviation between the detected vehicle height and the target vehicle height, wherein the controlling the actuator step begins when the deviation exceeds a predetermined threshold.

15. The method of claim 14, further comprising limiting the controlling the actuator step by increasing the threshold.

16. The method of claim 13, further comprising determining an integral over time of a deviation between the detected vehicle height and the target vehicle height, wherein the controlling the actuator step begins when the integral reaches a predetermined value.

* * * * *